United States Patent
Wang et al.

(10) Patent No.: US 12,548,361 B2
(45) Date of Patent: Feb. 10, 2026

(54) METHOD AND APPARATUS FOR PROCESSING DOCUMENT IMAGE BASED ON TEXT RECOGNITION AND IMAGE DIVISION, AND ELECTRONIC DEVICE

(71) Applicant: BEIJING BAIDU NETCOM SCIENCE TECHNOLOGY CO., LTD., Beijing (CN)

(72) Inventors: Wenjin Wang, Beijing (CN); Zhengjie Huang, Beijing (CN); Bin Luo, Beijing (CN); Qiming Peng, Beijing (CN); Weichong Yin, Beijing (CN); Shikun Feng, Beijing (CN); Shiwei Huang, Beijing (CN); Jingzhou He, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 459 days.

(21) Appl. No.: 18/181,800

(22) Filed: Mar. 10, 2023

(65) Prior Publication Data
US 2023/0222827 A1    Jul. 13, 2023

(30) Foreign Application Priority Data

May 30, 2022    (CN) .......................... 202210619581.1

(51) Int. Cl.
*G06V 30/414*    (2022.01)
*G06F 40/295*    (2020.01)
(Continued)

(52) U.S. Cl.
CPC .......... *G06V 30/414* (2022.01); *G06F 40/295* (2020.01); *G06F 40/30* (2020.01); *G06V 30/18143* (2022.01)

(58) Field of Classification Search
None
See application file for complete search history.

(56) References Cited

U.S. PATENT DOCUMENTS

2015/0100307 A1*   4/2015   Sun .................. G06F 40/284
                                                    704/9
2016/0117146 A1*   4/2016   Raux ................... G06F 3/167
                                                    715/716
(Continued)

FOREIGN PATENT DOCUMENTS

| CN | 110472107 A | 11/2019 |
| CN | 112163608 A | 1/2021 |

(Continued)

OTHER PUBLICATIONS

Office Action issued in corresponding CN Application No. 202210619581.1 with English translation dated Mar. 20, 2024 (17 pages).

(Continued)

*Primary Examiner* — Andrew H Lam
(74) *Attorney, Agent, or Firm* — Osha Bergman Watanabe & Burton LLP

(57) ABSTRACT

In a method for processing a document image, a document image to be processed is acquired. Text nodes of multiple granularities, visual nodes of multiple granularities, respective node information of the text nodes, and respective node information of the visual nodes in the document image are obtained. A multi-granularity and multi-modality document graph is construct based on the text nodes of multiple granularities, the visual nodes of multiple granularities, the respective node information of the text nodes and the respective node information of the visual nodes. Multi-granularity semantic feature information of the document image is determined based on the multi-granularity and (Continued)

multi-modality document graph, the respective node information of the text nodes and the respective node information of the visual nodes.

20 Claims, 9 Drawing Sheets

(51) Int. Cl.
*G06F 40/30* (2020.01)
*G06V 30/18* (2022.01)

(56) References Cited

U.S. PATENT DOCUMENTS

| | | | |
|---|---|---|---|
| 2018/0165539 A1* | 6/2018 | Park | G06V 10/82 |
| 2022/0019744 A1* | 1/2022 | Yu | G06F 40/56 |
| 2022/0129768 A1 | 4/2022 | Xiao et al. | |
| 2022/0253631 A1* | 8/2022 | Li | G06V 30/414 |

FOREIGN PATENT DOCUMENTS

| | | |
|---|---|---|
| CN | 112819052 A | 5/2021 |
| CN | 113361247 A | 9/2021 |
| CN | 113822224 A | 12/2021 |
| CN | 113901211 A | 1/2022 |
| CN | 113901954 A | 1/2022 |
| CN | 113920313 A | 1/2022 |
| CN | 113934882 A | 1/2022 |
| CN | 113946698 A | 1/2022 |
| CN | 114064967 A | 2/2022 |
| CN | 114155543 A | 3/2022 |
| CN | 114218889 A | 3/2022 |
| JP | 2021093080 A | 6/2021 |

OTHER PUBLICATIONS

Zhang, X. et al. "AMBERT a Pre-trained Language Model with Multi-Grained Tokenization" Oct. 2020 (16 pages).
Xu, Y. et al. "LayoutLMv2: Multi-modal Pre-training for Visually-Rich Document Understanding" Jan. 2022 (13 pages).
Deng, Y. et al. "Collaborative Attention Network Model for Cross-modal Retrieval" Computer Science vol. 47, No. Apr. 4, 2020 pp. 54-59 (6 pages).
Wang, J. "Enriching image descriptions by fusing fine-grained semantic features with a transformer" Journal of East China Normal University (Natural Science) Sep. 2020 pp. 56-67 (12 pages).

* cited by examiner

METHOD AND APPARATUS FOR PROCESSING DOCUMENT IMAGE BASED ON TEXT RECOGNITION AND IMAGE DIVISION, AND ELECTRONIC DEVICE

CROSS-REFERENCE TO RELATED APPLICATION

This application claims priority and benefits to Chinese Application No. 202210619581.1, filed on May 30, 2022, the entire content of which is incorporated herein by reference.

TECHNICAL FIELD

The disclosure relates to a field of image processing technologies, specifically to fields of artificial intelligence (AI) and natural language processing (NLP) technologies, and particularly to a method and an apparatus for processing a document image, and an electronic device.

BACKGROUND

Understanding of a visually-rich document is an important task of document intelligence which includes processing, analyzing and scanning a digital document. However, in order to accurately understand the content of the visually-rich document, information about the text and visual elements contained in a document and a layout relationship between these elements need to be comprehensively considered.

SUMMARY

According to a first aspect of the disclosure, a method for processing a document image is provided, and includes:
  acquiring a document image to be processed;
  acquiring text nodes of multiple granularities, visual nodes of multiple granularities, respective node information of the text nodes, and respective node information of the visual nodes, from the document image;
  constructing a multi-granularity and multi-modality document graph based on the text nodes, the visual nodes, the respective node information of the text nodes, and the respective node information of the visual nodes; and
  determining multi-granularity semantic feature information of the document image based on the multi-granularity and multi-modality document graph, the respective node information of the text nodes and the respective node information of the visual nodes.

According to a second aspect of the disclosure, an electronic device is provided. The electronic device includes:
  at least one processor, and a memory communicatively connected to the at least one processor. The memory stores instructions executable by the at least one processor. The instructions are executed by the at least one processor, to cause the at least one processor to:
  acquire a document image to be processed;
  acquire text nodes of multiple granularities, visual nodes of multiple granularities, respective node information of the text nodes, and respective node information of the visual nodes, from the document image;
  construct a multi-granularity and multi-modality document graph based on the text nodes, the visual nodes, the respective node information of the text nodes, and the respective node information of the visual nodes; and
  determine multi-granularity semantic feature information of the document image based on the multi-granularity and multi-modality document graph, the respective node information of the text nodes and the respective node information of the visual nodes.

According to a third aspect of the disclosure, a non-transitory computer-readable storage medium having computer instructions stored thereon is provided. The computer instructions are configured to cause a computer to perform the method as described above.

It is understandable that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The embodiments of the disclosure are described as below with reference to the accompanying drawings, which include various details of embodiments of the disclosure to facilitate understanding, and should be considered as merely as examples. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

In the technical solution of the disclosure, processing such as acquisition, storage and application of user personal information involved in the disclosure conform to the provisions of relevant legal regulations, and do not violate the public-order yield. Personal information of the user involved is acquired, stored and applied with the consent of the user.

It is noteworthy that, Understanding of a visually-rich document is an important task of document intelligence which includes processing, analyzing and scanning a digital document. However, in order to accurately understand the content of the visually-rich document, information about the text and visual elements contained in a document and a layout relationship between these elements need to be comprehensively considered. Therefore, it has become an urgent problem to be solved how to comprehensively perform a visually-rich document information representation on a document image.

In order to solve the above problem, a method and an apparatus for processing a document image, and an electronic device are provided in the disclosure.

Figure 1:
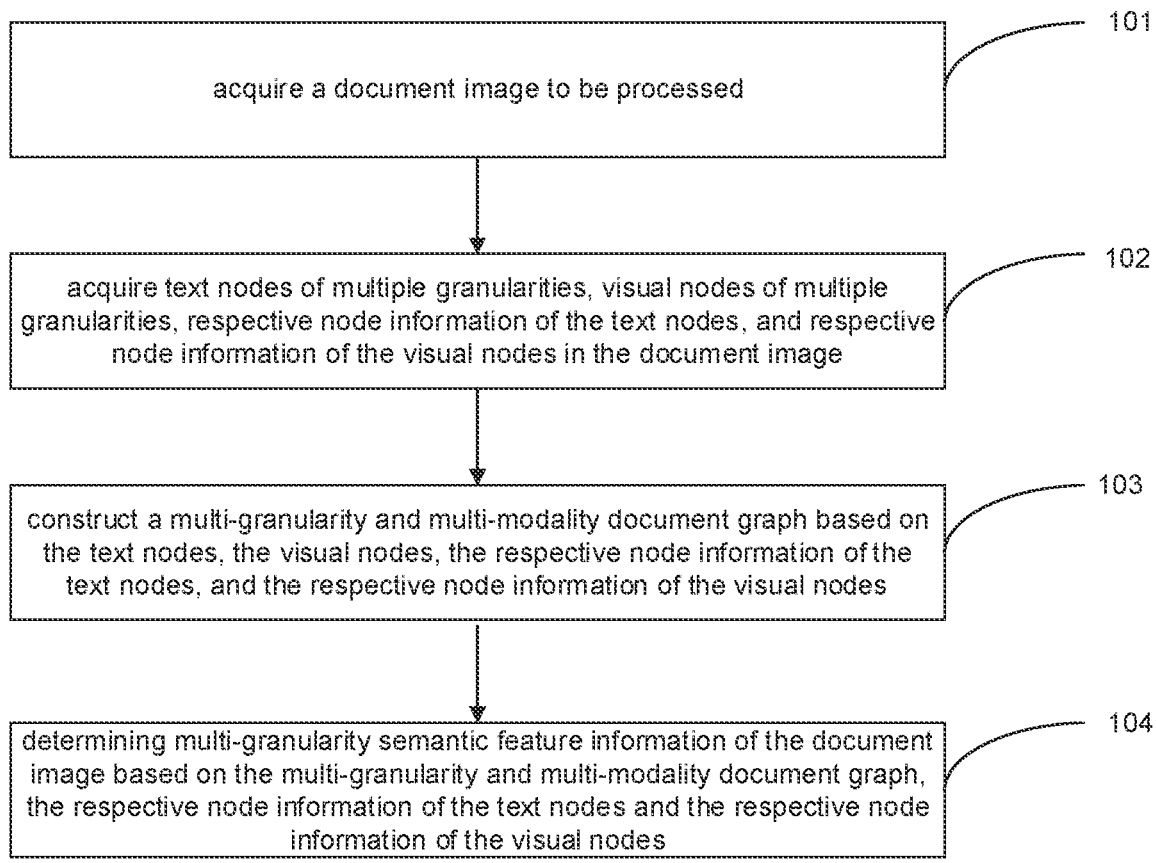
FIG. 1 is a diagram illustrating a first embodiment of the disclosure.

FIG. 1 is a flowchart illustrating a method for processing a document image according to the disclosure. It is noteworthy that, the method for processing a document image is performed by an apparatus for processing a document image according to embodiments of the disclosure. The apparatus for processing a document image may be included in an electronic device or may be an electronic device. As illustrated in FIG. 1, the method may include the following.

At step 101, a document image to be processed is acquired.

In some embodiments, the document image refers to a document in a format of image. For example, a paper document can be converted to a document in the format of image through some way, and thus the document image to be processed can be a scanned document. The document image may include characters, texts, figures, tables or the like. The document image may be a document in any field, such as an academic article, a project plan of a company, an invoice and a receipt.

In some embodiments, the method can be executed by an electronic device, such as a laptop computer, a desktop computer, or a workstation. The document image to be processed may be a document image that needs to be processed selected by the user through an interaction interface of the electronic device, such that the document image to be processed is acquired based on information submitted by the user on the interaction interface. Alternatively, the document image to be processed may be automatically acquired base on a preset program, for example, a scanned document image is acquired automatically based on a preset route.

At step 102, text nodes of multiple granularities, visual nodes of multiple granularities, respective node information of the text nodes, and respective node information of the visual nodes are acquired from the document image.

In the related art, the implementation of achieving the semantic expressions of the document image mainly considers elements, such as words and image segment, in the document, i.e., the text nodes and the visual nodes of the same granularity. The inventor of the disclosure has found that, natural semantic units, such as phrases or multi-word expressions, as well as salient visual areas that dominate the understanding of the document generally contain rich and consistent semantic information and have an important effect on the understanding of the document. Therefore, in the disclosure, the document elements of multiple granularities and multiple modalities are considered to acquire the semantic feature information of the document image.

In some embodiments, the text nodes of multiple granularities refer to text nodes corresponding to different subdivision degrees, i.e., text nodes obtained through dividing the text by different granularities. For example, the text nodes of multiple granularities include text nodes corresponding to a first subdivision degree that the text in the document image is subdivided by a character or word granularity (that is, the text in the document image is divided by characters or words), text nodes corresponding to a second subdivision degree that the text in the document image is subdivided by a phrase or word segment granularity (that is, the text in the document image is divided by phrases or word segments), or text nodes corresponding to a third subdivision degree that the text in the document is subdivided by a sentence granularity (that is, the text in the document image is divided by sentences). In addition, the above-mentioned "text nodes" of a granularity correspond to text portions obtained by dividing the text in the document image by a corresponding granularity, and the above mentioned "node information" includes a text content of the text portion (i.e., the character or word, or the phrase or word segment, or the sentence) corresponding to the text node and position information of the text portion (or text content) relative to the document image.

As an example, the text nodes of multiple granularities may include coarse-grained text nodes and fine-grained text nodes. The fine-grained text nodes respectively correspond to characters or words in the document image, such as English word "telephone" or "date", or Chinese character "电" or "话". The coarse-grained text nodes respectively correspond to phrases or multi-word expressions in the document image, such as English phrases "football game" or "watch TV" or Chinese phrases "电话," "邮箱," "日期" or the like. Text recognition may be performed on the document image through Optical Character Recognition (OCR) technology, to obtain words or characters in the document image and their position information, the text segments in the document image and their position information. Each obtained character or word is taken as a fine-grained text node, and for each fine-grained text node, the text content corresponding to the fine-grained text node and position information of the fine-grained text node are taken as the node information of the fine-grained text node. In addition, each obtained text segment is taken as a coarse-grained text node, and for each coarse-grained text node, the text content corresponding to the coarse-grained text node and position information corresponding to the coarse-grained text node are taken as the node information of the coarse-grained text node.

In some embodiments, the visual nodes of multiple granularities refers to visual nodes corresponding to different subdivision degrees, i.e., visual nodes obtained through dividing the image by different granularities. For example, the visual nodes of multiple granularities include visual nodes corresponding to a first subdivision degree that the document image is subdivided by an image segment granularity (that is, the document image is divided by image segments), or include visual nodes corresponding to a second subdivision degree that the document image is subdivided by a component area granularity (that is, the document image is divided by component areas in the document layout of the document image), or include visual nodes corresponding to a third subdivision degree that the document image is divided by a salient region granularity (that is, the document image is divided by salient regions in the document image). In addition, the above-mentioned "visual nodes" of a granularity correspond to image content information obtained by dividing the document image by a corresponding granularity, and the above mentioned "node information" includes image content information of an image portion (i.e., the image segment, or the component area, or the salient visual area) corresponding to the visual node and position information of the image portion (or image content) relative to the document image.

As an example, the visual nodes of multiple granularities may include coarse-grained visual nodes and fine-grained visual nodes. The fine-grained visual nodes respectively correspond to image segments in the document image, such as, the image segments obtained after the document image is segmented based on a preset image segmentation method. The coarse-grained visual nodes respectively correspond to salient visual regions in the document image, such as a title region and a table, chart, figure region in the document image. The document image may be segmented in a preset image segmentation method to acquire a plurality of image segments and respective position information of the image segments relative to the document image. Each obtained image segment is taken as a fine-grained visual node, and for each fine-grained visual node, the content information of the image segment corresponding to the fine-grained visual node and the position information of the image segment relative to the document image are taken as the node information of the fine-grained visual node. In addition, a plurality of partitions may be acquired in the document image based on a document layout parsing method in the related art, and the partitions each may be taken as a salient visual region. Each obtained salient visual region may be taken as a coarse-grained visual node, and for each coarse-grained visual node, the image content and position information of the salient visual region corresponding to the coarse-grained visual node are taken as the node information of the coarse-grained visual node.

At step 103, a multi-granularity and multi-modality document graph is constructed based on the text nodes of multiple granularities, the visual nodes of multiple granularities, the respective node information of the text nodes, and the respective node information of the visual nodes.

In some embodiments, the multi-granularity and multi-modality document graph represents relationships between nodes of different modalities and different granularities in the document image. That is, the multi-granularity and multi-modality document graph includes the text nodes of multiple granularities, the visual nodes of multiple granularities, position relationships between the text nodes of multiple granularities, position relationships between the visual nodes of multiple granularities, and position relationships between the text nodes of multiple granularities and the visual nodes of multiple granularities.

As an implementation, nodes of different granularities and different modalities are connected based on a preset method to generate edges. Each edge represents a distance between two nodes, such that the position relationships between different nodes may be represented by respective lengths of the edges. That is, the multi-granularity and multi-modality document graph is constituted by the nodes and the edges.

At step 104, multi-granularity semantic feature information of the document image is determined based on the multi-granularity and multi-modality document graph, the respective node information of the text nodes of multiple granularities and the respective node information of the visual nodes of multiple granularities.

That is, the multi-granularity semantic feature information of the document image is obtained by extracting semantic information from the document image using the relationships between the nodes in combination with the respective node information of the nodes.

The multi-granularity semantic feature information refers to semantic expression information of the document image obtained by considering elements of different granularities, and the multi-granularity semantic feature information includes semantic features in a text aspect, semantic features in a visual aspect, and semantic features in a layout aspect.

In some embodiments, the multi-granularity semantic feature information of the document image may be determined by a preset semantic feature extraction model. The semantic feature extraction model has learned relationships between the nodes based on the multi-granularity and multi-modality document graph, and has learned a capability of extracting semantic features based on the respective node information of the nodes and the relationship information between the nodes in the document image. The respective node information of the text nodes of multiple granularities and the respective node information of the visual nodes of multiple granularities form a sequence and the sequence is inputted into the semantic feature extraction model to acquire multi-granularity semantic feature information of the document image.

In some embodiments, if the text nodes of multiple granularities include the fine-grained text nodes and the coarse-grained text nodes, and the visual nodes of multiple granularities include the fine-grained visual nodes and the coarse-grained visual nodes, the respective semantic feature information of the fine-grained text nodes and the respective semantic feature information of the fine-grained visual nodes may be acquired based on the respective node information of the fine-grained text nodes, the respective node information of the fine-grained visual nodes, and relationships between the fine-grained nodes. Since there is a position inclusion relationship between a coarse-grained node and a corresponding fine-grained node, fine-grained nodes included in each coarse-grained node may be determined based on the position relationships between the coarse-grained nodes and the fine-grained nodes, and an average value of respective semantic feature information corresponding to the fine-grained nodes is taken as the semantic feature information of the coarse-grained node. Therefore, the respective semantic feature information of the coarse-grained text nodes and the respective semantic feature information of the coarse-grained visual nodes are obtained through the above way. The respective semantic feature information of the coarse-grained text nodes and the respective semantic feature information of the coarse-grained visual nodes are encoded to obtain respective target semantic feature information of the coarse-grained text nodes and respective target semantic feature information of the coarse-grained visual nodes. The target semantic feature information of a coarse-grained node may be merged with the respective semantic feature information of the fine-grained nodes based on the relationships between the fine-grained nodes and the coarse-grained nodes, to finally obtain the multi-granularity semantic feature information of the document image.

With the method for processing the document content according to embodiments of the disclosure, the multi-granularity and multi-modality document graph is constructed based on the acquired text nodes of multiple granularities, the visual nodes of multiple granularities, the respective node information of the text nodes, and the respective node information of the visual nodes in the document image to be processed, and the multi-granularity semantic feature information of the document image is determined based on the multi-granularity and multi-modality document graph, the respective node information of the text nodes and the respective node information of the visual nodes. That is, elements of different granularities in the document image are considered and the complex relationships between the elements of different modalities and different granularities are represented by the multi-granularity and multi-modality document graph, so that the acquired semantic feature information is richer and more comprehensive, thereby comprehensively representing the visually-rich document information of the document image, to improve the accuracy of understanding a document.

An implementation process of acquiring the text nodes of multiple granularities, the visual nodes of multiple granularities, the respective node information of the text nodes and the respective node information of the visual nodes from the document image are introduced below.

Figure 2:
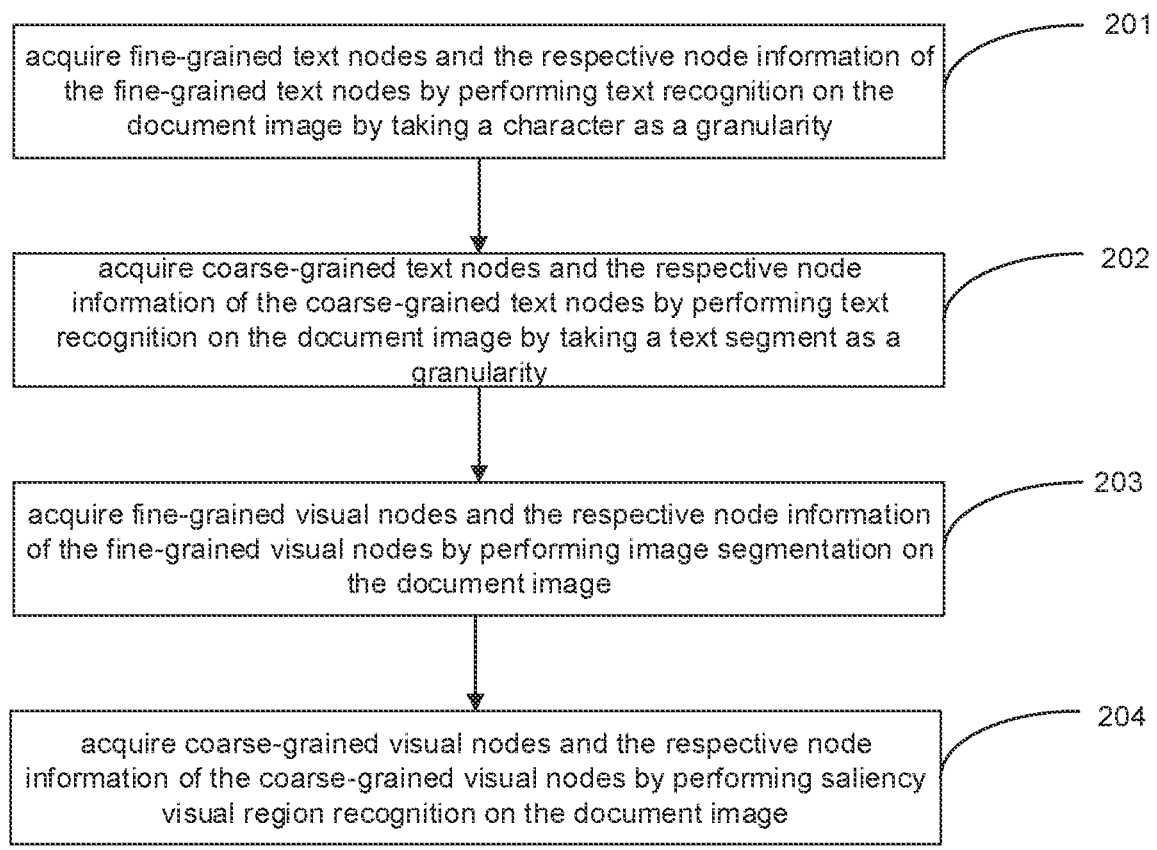
FIG. 2 is a diagram illustrating a second embodiment of the disclosure.

FIG. 2 is a flowchart illustrating an implementation process of acquiring the text nodes of multiple granularities, the visual nodes of multiple granularities, the respective node information of the text nodes and the respective node information of the visual nodes from a document image according to embodiments of the disclosure. As illustrated in FIG. 2, the process includes the following.

At step 201, fine-grained text nodes and respective node information of the fine-grained text nodes are acquired by performing text recognition on the document image by taking a character or a word as a granularity.

As an implementation, the text recognition may be performed, by taking a character or a word as the granularity, on the document image based on an OCR technology to acquire recognized characters or recognized words and respective position information of the recognized characters or recognized words relative to the image document. Each recognized character or each recognized word is taken as a fine-grained text node; and for each fine-grained text node, the vector expression of the recognized character or the recognized word corresponding to the fine-grained text node and the position information of the recognized character or the recognized word in the image document are taken as the node information of the fine-grained text node.

At step 202, coarse-grained text nodes and respective node information of the coarse-grained text nodes are acquired by performing text recognition on the document image by taking a text segment as a granularity.

In an implementation, the text recognition may be performed, by taking a text segment as the granularity, on the document image based on the OCR technology to acquire recognized text segments and respective position information of the text segments relative to the image document. Each recognized text segment is taken as a coarse-grained text node; and for each coarse-grained text node, the vector expression of the recognized text segment corresponding to the coarse-grained text node and the position information of the recognized text segment in the image document are taken as the node information of the coarse-grained text node.

At step 203, fine-grained visual nodes and respective node information of the fine-grained visual nodes are acquired by performing image segmentation on the document image.

As an implementation, the document image is segmented in a preset image segmentation method to acquire a plurality of image segments and respective position information of the image segments relative to the document image. Each obtained image segment is taken as a fine-grained visual node. Visual information extraction is performed by a visual encoder on the document image to acquire respective visual information of the image segments. For each fine-grained visual node, the visual information of the image segment corresponding to the fine-grained visual node and the position information of the image segment in the document image are taken as the node information of the fine-grained visual node.

At step 204, coarse-grained visual nodes and respective node information of the coarse-grained visual nodes are acquired by performing salient visual region recognition on the document image.

In some embodiments, the salient visual regions can be detected from the image document and respective position information of the salient visual regions in the image document can be obtained. For each salient visual region, visual information of the salient visual region is determined based on the visual information of the image segment included in the salient visual region. Each salient visual region is taken as a coarse-grained visual node; and for each coarse-grained visual node, the visual information of the salient visual region corresponding to the coarse-grained visual node and the position information of the salient visual region are taken as the node information of the coarse-grained visual node.

As an example, acquiring the salient visual regions from the image document may include the following. Each two coarse-grained text nodes are connected to construct a coarse-grained text image. Each edge between the nodes represents a distance between these two nodes. The coarse-grained text image is divided into a plurality of sub-images based on a graph partitioning algorithm. Each sub-image is taken as a salient visual region, and for each salient visual region, a union set of respective position information of all coarse-grained text nodes included in the sub-image is determined as the position information of the salient visual region.

As another example, acquiring the salient visual regions from the image document may include the following. Each two coarse-grained text nodes are connected to construct a coarse-grained text image. Each edge between the nodes represents a distance between these two nodes. The coarse-grained text image is divided into a plurality of high-density regions by using a density-based clustering algorithm. Each high-density region is taken as a salient visual region, and for each salient visual region, a union set of respective position information of all coarse-grained text nodes included in the high-density region is determined as the position information of the salient visual region.

As another example, a plurality of partitions in the image document may be acquired based on a document layout analysis method in the related art. Each partition is taken as a salient visual region, and for each salient visual region, the position information of the partition corresponding to the salient visual region is taken as the position information of the salient visual region.

With the method for processing the document image according to embodiments of the disclosure, the multi-granularity and multi-modality document graph is constructed by acquiring the fine-grained text nodes, the coarse-grained text nodes, the fine-grained visual nodes, the coarse-grained visual nodes, the respective node information of the fine-grained text nodes, the respective node information of the coarse-grained text nodes, the respective node information of the fine-grained visual nodes, and the respective node information of the coarse-grained visual nodes, and the multi-granularity semantic feature information of the document image is determined based on the multi-granularity and multi-modality document graph, the respective node information of the coarse-grained nodes and the respective node information of the fine-grained nodes. In the solution, richer and more comprehensive semantic feature information may be acquired by considering the fine-grained elements, coarse-grained elements and relationships between elements of different granularities and different modalities, thereby improving the accuracy of understanding a document.

The process of acquiring the multi-granularity and multi-modality document graph will be described below.

Figure 3:
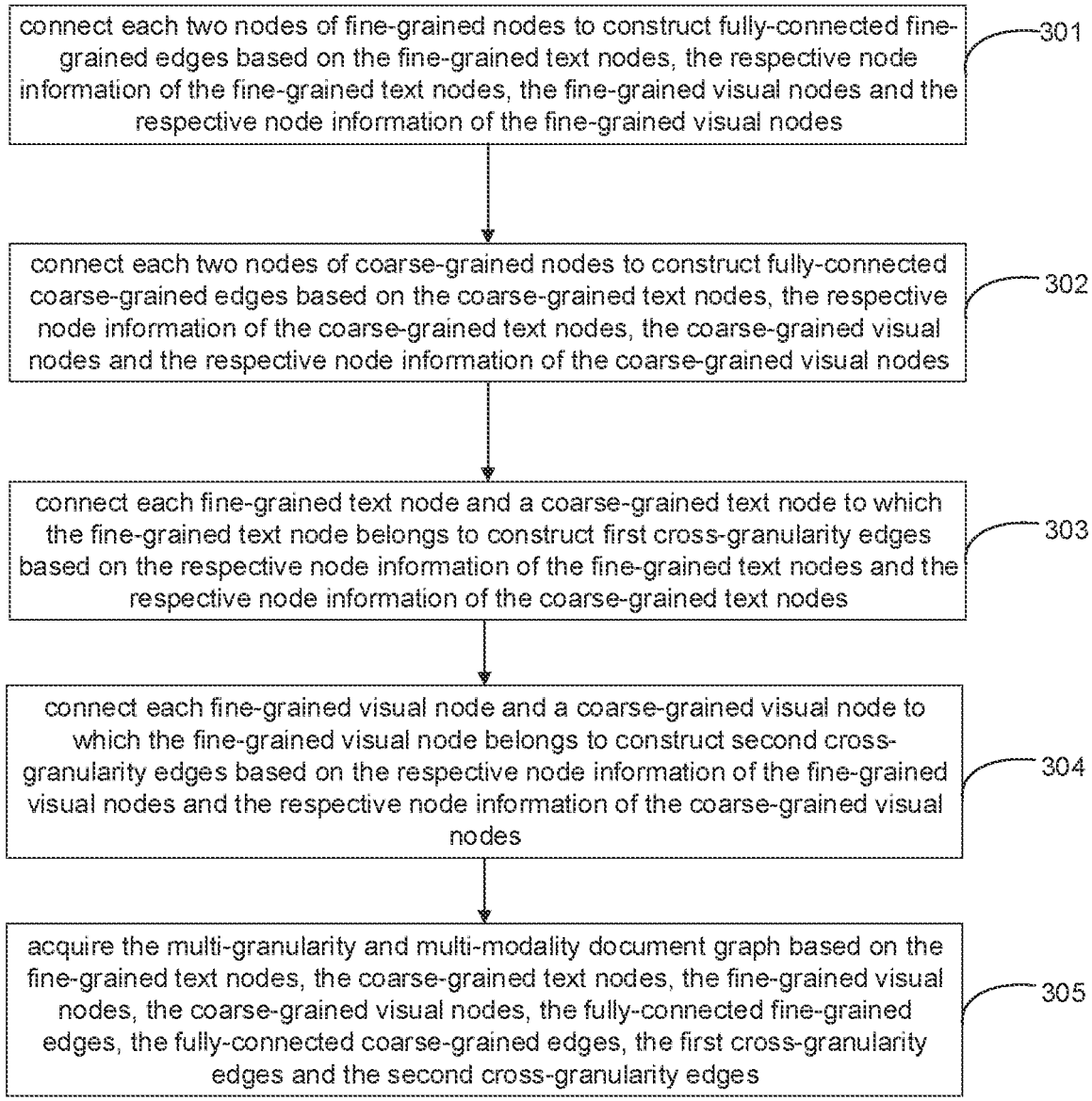
FIG. 3 is a diagram illustrating a third embodiment of the disclosure.

FIG. 3 is a flowchart illustrating constructing a multi-granularity multi-modality document graph according to embodiments of the disclosure. As illustrated in FIG. 3, on the basis of the above embodiments, an implementation process of step 103 in FIG. 1 includes the following.

At step 301, each two nodes of the fine-grained nodes are connected to construct fully-connected fine-grained edges based on the fine-grained text nodes, the respective node information of the fine-grained text nodes, the fine-grained visual nodes and the respective node information of the fine-grained visual nodes. The fine-grained nodes are all of the fine-grained text nodes and the fine-grained visual nodes.

That is, each two nodes of the fine-grained text nodes are connected, each two nodes of the fine-grained visual nodes are connected, and each node of the fine-grained text nodes and each node of the fine-grained visual nodes are connected to form the fully-connected fine-grained edges.

At step 302, each two nodes of coarse-grained nodes are connected to construct fully-connected coarse-grained edges based on the coarse-grained text nodes, the respective node information of the coarse-grained text nodes, the coarse-grained visual nodes, and the respective node information of the coarse-grained visual nodes. The coarse-grained nodes are all of the coarse-grained text nodes and the coarse-grained visual nodes.

That is, each two nodes of the coarse-grained text nodes are connected, each two nodes of the coarse-grained visual nodes are connected, and each node of the coarse-grained text nodes and each node of the coarse-grained visual nodes are connected to form the fully-connected coarse-grained edges.

At step 303, each fine-grained text node and a coarse-grained text node to which the fine-grained text node belongs are connected to construct first cross-granularity edges based on the respective node information of the fine-grained text nodes and the respective node information of the coarse-grained text nodes.

It is understandable that, since the fine-grained text nodes correspond to the character granularity or the word granularity, while the coarse-grained text nodes correspond to the text segment granularity, the character or the word corresponding to a fine-grained text node belongs to a certain coarse-grained text node. Therefore, the first cross-granularity edge between a fine-grained text node and a coarse-grained text node to which the fine-grained text node belongs may be formed based on the node information of the fine-grained text node and the coarse-grained text node, such that the subordinate relationships between the fine-grained text nodes and the coarse-grained text nodes can be expressed by the first cross-granularity edges.

In some embodiments, for each fine-grained text node, a target coarse-grained text node to which the fine-grained text node belongs may be determined based on the node information of the fine-grained text node and the node information of the coarse-grained text node. The character or the word corresponding to the fine-grained text node belongs to the text segment of the target coarse-grained text node, and the position information of the fine-grained text node is included in the position information of the target coarse-grained text node. The first cross-granularity edges can be constructed between the fine-grained text nodes and the target coarse-grained text nodes.

At step 304, each fine-grained visual node and a coarse-grained visual node to which the fine-grained visual node belongs is connected to construct second cross-granularity edges, based on the respective node information of the fine-grained visual nodes and the respective node information of the coarse-grained visual nodes.

It is understandable that, since the fine-grained text node corresponds to an image segment, while the coarse-grained visual node corresponds to a salient visual region, the image segment corresponding to the fine-grained visual node belongs to a certain salient visual region corresponding to a certain coarse-grained visual node, such that the second cross-granularity edge can be constructed between the fine-grained visual node and the coarse-grained visual node to which the fine-grained visual node belongs based on the position relationship between the fine-grained visual node and the coarse-grained visual node. Therefore, the subordinate relationships between the fine-grained visual nodes and the coarse-grained visual nodes can be expressed by the second cross-granularity edges.

In some embodiments, for each fine-grained visual node, respective intersection over union (IOU) values between a bounding box corresponding to the position information of the fine-grained visual node and bounding boxes corresponding to the position information of the coarse-grained visual nodes may be determined based on the node information of the fine-grained visual node and the respective node information of the coarse-grained visual nodes, and a coarse-grained visual node corresponding to a maximum IOU value is taken as the target coarse-grained visual node to which the fine-grained visual node belongs. The second cross-granularity edges can be constructed between the fine-grained visual nodes and the target coarse-grained visual nodes.

At step 305, the multi-granularity and multi-modality document graph is acquired based on the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

That is, the multi-granularity and multi-modality document graph is formed by the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

With the method for processing the document image according to embodiments of the disclosure, the fully-connected fine-grained edges are formed between each two of all fine-grained nodes, and the fully-connected coarse-grained edges are formed between two nodes of all coarse-grained nodes, such that that the fully-connected fine-grained edges represent the relative position relationships between the fine-grained nodes, and the fully-connected coarse-grained edges represent the relative position relationships between the coarse-grained nodes. The first cross-granularity edges are formed between the fine-grained text nodes and the coarse-grained text nodes to which the fine-grained text node respectively belong and the second cross-granularity edges are formed between the fine-grained visual nodes and the coarse-grained visual nodes to which the fine-grained visual nodes respectively belong, such that the subordinate relationships between the fine-grained nodes and the coarse-grained nodes are represented by the cross-granularity edges. Therefore, the constructed multi-granularity and multi-modality document graph may represent the complex relationships between the nodes.

Based on the above embodiments, the process of determining multi-granularity semantic feature information of the document image will be described below.

Figure 4:
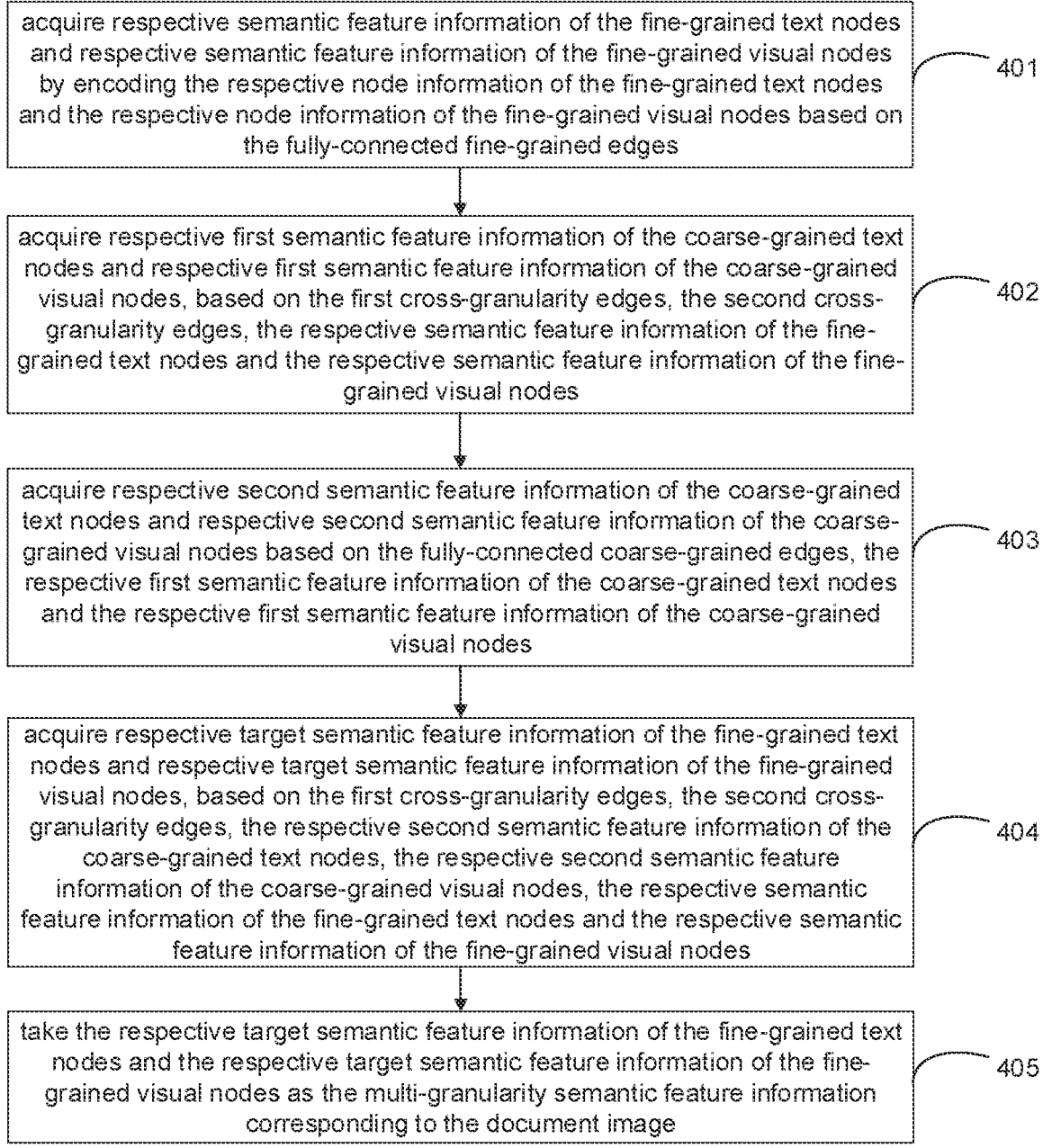
FIG. 4 is a diagram illustrating a fourth embodiment of the disclosure.

FIG. 4 is a flowchart illustrating determining multi-granularity semantic feature information of the document image according to embodiments of the disclosure. As illustrated in FIG. 4, on the basis of the above embodiments, an implementation process of step 104 in FIG. 1 may include the following.

At step 401, respective semantic feature information of the fine-grained text nodes and respective semantic feature information of the fine-grained visual nodes are acquired by encoding respectively the respective node information of the fine-grained text nodes and the respective node information of the fine-grained visual nodes based on the fully-connected fine-grained edges.

That is, the respective node information of the fine-grained text nodes and the respective node information of the fine-grained visual nodes are encoded based on the relative position relationships between the fine-grained nodes, and the respective semantic feature information of the fine-grained text nodes and the respective semantic feature information of the fine-grained visual nodes are acquired based on the encoded node information of the fine-grained nodes in combination of the respective node information of the fine-grained nodes.

In some embodiments, the node information of the each fine-grained text node and the node information of the each fine-grained visual node are encoded respectively through a Transformer model for learning relative position relationships between the fine-grained nodes based on the fully-connected fine-grained edges in the multi-granularity and multi-modality document graph, and the semantic feature information of the each fine-grained text node and the semantic feature information of the each fine-grained visual node may be generated based on the encoded node information in combination with the position relationships between the fine-grained nodes and the node information of the each fine-grained node.

At step 402, respective first semantic feature information of the coarse-grained text nodes and respective first semantic feature information of the coarse-grained visual nodes are acquired, based on the first cross-granularity edges, the second cross-granularity edges, the respective semantic feature information of the fine-grained text nodes and the respective node information of the fine-grained visual nodes.

It is understandable that, the first cross-granularity edge represent a subordinate relationship between a fine-grained text node and a coarse-grained text node, and the second cross-granularity edge represents a subordinate relationship between a fine-grained visual node and a coarse-grained visual node, such that it can be considered that each coarse-grained text node is consisted of a plurality of fine-grained text nodes and the each coarse-grained visual node is consisted of a plurality of fine-grained visual nodes. Therefore, the first semantic feature information of the coarse-grained text node may be determined based on the respective semantic feature information of the plurality of fine-grained text nodes contained in the coarse-grained text node, and the first semantic feature information of the coarse-grained visual node may be determined based on the respective semantic feature information of the plurality of fine-grained visual nodes in the coarse-grained visual node.

In some embodiments, an implementation process of step 402 may include the following. For each coarse-grained text node, target fine-grained text nodes connected to the coarse-grained text node are determined based on the first cross-granularity edges, and the first semantic feature information of the coarse-grained text node is acquired by aggregating the respective semantic feature information of the target fine-grained text nodes. For each coarse-grained visual node, target fine-grained visual nodes connected to the coarse-grained visual node are determined based on the second cross-granularity edges, and the first semantic feature information of the coarse-grained visual node is obtained by aggregating the respective semantic feature information of the target fine-grained visual nodes.

That is, for each coarse-grained text node, one or more target fine-grained text nodes connected to the coarse-grained text node are determined based on the first cross-granularity edges. The respective semantic feature information of the one or more target fine-grained text nodes is aggregated. For example, the respective semantic feature information of all target fine-grained text nodes are averaged to obtain an average value. The average value is determined as the first semantic feature information of the coarse-grained text node. For each coarse-grained visual node, one or more target fine-grained visual nodes connected to the coarse-grained visual node may be determined based on the second cross-granularity edges. The respective semantic feature information of the one or more target fine-grained visual nodes is aggregated. For example, the respective semantic feature information of all target fine-grained visual nodes are averaged to obtain an average value. The average value is determined as the first semantic feature information of the coarse-grained visual node.

At step 403, respective second semantic feature information of the coarse-grained text nodes and respective second semantic feature information of the coarse-grained visual nodes are acquired based on the fully-connected coarse-grained edges, the respective first semantic feature information of the coarse-grained text nodes and the respective first semantic feature information of the coarse-grained visual nodes.

It is understandable that, both the first semantic feature information of the coarse-grained text node and the first semantic feature information of the coarse-grained visual node are obtained respectively by aggregating the semantic feature information of the corresponding fine-grained nodes, which may not completely represent the semantic feature information of a corresponding coarse-grained node. Therefore, the second semantic feature information of the each coarse-grained text node and the second semantic feature information of the each coarse-grained visual node are obtained respectively by performing feature extraction on the first feature information of that coarse-grained text node and the first feature information of that coarse-grained visual node based on the relative position relationships between the coarse-grained nodes. Therefore, a more accurate semantic expression on the coarse-grained node can be achieved based on the second semantic feature information.

In some embodiments, the respective second semantic feature information of the coarse-grained text nodes and the respective second semantic feature information of the coarse-grained visual nodes may be generated by encoding the respective first semantic feature information of the coarse-grained text nodes and the respective second semantic feature information of the coarse-grained visual nodes through a Transformer model or learning the relative position relationships between the coarse-grained nodes based on the fully-connected coarse-grained edges in the multi-granularity and multi-modality document graph.

At step 404, respective target semantic feature information of the fine-grained text nodes and respective target semantic feature information of the fine-grained visual nodes are acquired, based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes.

It is understandable that, the first cross-granularity edge may express a subordinate relationship between the a fine-grained text node and a coarse-grained text node, and the second cross-granularity edge may express a subordinate relationship between a fine-grained visual node and a coarse-grained visual node, such that each fine-grained text node belongs to a respective coarse-grained text node connected to the fine-grained text node through the first cross-granularity edge, and each fine-grained visual node belongs to a respective coarse-grained visual node connected to the fine-grained text node through the second cross-granularity edge. Since the semantic feature information of the fine-grained node and the semantic feature information of the coarse-grained node that has a subordinate relationship with the fine-grained node shall have consistency, the respective target semantic feature information of the fine-grained nodes may be determined according to the respective semantic feature information of the fine-grained nodes and the respective semantic feature information of the coarse-grained nodes corresponding to the fine-grained nodes such that the target semantic feature information of each fine-grained node contains the semantic feature information of the fine-grained node and the second semantic feature information of the corresponding coarse-grained node simultaneously.

In some embodiments, an implementation process of step 404 may include the following. For example fine-grained text node, the target semantic feature information of the fine-grained text node is acquired by determining a target coarse-grained text node to which the fine-grained text node belongs based on the first cross-granularity edges and by performing fusion processing on the semantic feature information of the fine-grained text node and the second semantic feature information of the target coarse-grained text node. For each fine-grained visual node, the target semantic feature information of the fine-grained visual node is obtained by determining the target coarse-grained visual node to which the fine-grained visual node belongs based on the second cross-granularity edge and by performing fusion processing on the semantic feature information of the fine-grained visual node and the second semantic feature information of the target coarse-grained visual node.

That is, for each fine-grained text node, one or more target coarse-grained text nodes connected to the fine-grained text node may be determined based on the first cross-granularity edges. The fusion processing may be performed on the semantic feature information of the fine-grained text node and the respective second semantic feature information of the one or more target coarse-grained text nodes. For example, the target semantic feature information of the fine-grained text node may be acquired, by performing superimposed calculation on the semantic feature information of the fine-grained text node and the respective second semantic feature information of the one or more target coarse-grained text nodes. For each fine-grained visual node, one or more target fine-grained visual nodes connected to the fine-grained visual node may be determined based on the second cross-granularity edges. The fusion processing may be performed on the semantic feature information of the fine-grained visual node and the respective second semantic feature information of the one or more target coarse-grained visual nodes. For example, the target semantic feature information of the fine-grained visual node may be acquired by performing superimposed calculation on the semantic feature information of the fine-grained visual node and the respective second semantic feature information of the one or more target coarse-grained visual nodes.

At step 405, the respective target semantic feature information of the fine-grained text nodes and the respective target semantic feature information of the fine-grained visual nodes are taken as the multi-granularity semantic feature information of the document image.

It is understandable that, since the respective semantic feature information of the one or more coarse-grained text nodes are introduced into the target semantic feature information of the fine-grained text node and the respective semantic feature information of the one or more coarse-grained visual nodes are introduced into the target semantic feature information of the fine-grained visual node (that is, both the target semantic feature information of the fine-grained text node and the target semantic feature information of the fine-grained visual node include the semantic feature information of corresponding coarse-grained nodes), the respective target semantic feature information of the fine-grained text nodes and the respective target semantic feature information of the fine-grained visual nodes may be taken as the multi-granularity semantic feature information of the document image, so that the accuracy of understanding a document is improved, and a multi-modality information expression with richer semantics is provided for subsequent information extraction and classification of the document image.

With the method for processing the document image according to embodiments of the disclosure, the respective semantic feature information of the fine-grained nodes are acquired by encoding the respective node information of the fine-grained nodes based on the fully-connected fine-grained edges, the respective first semantic feature information of the coarse-grained text nodes is acquired based on the cross-granularity edges and the respective semantic feature information of the fine-grained nodes, the respect second semantic feature information of the coarse-grained nodes is acquired by processing the first semantic feature information of the coarse-grained text nodes, respective target semantic feature information of the fine-grained nodes is acquired based on the cross-granularity edges, the respective second semantic feature information of the coarse-grained nodes and the respective semantic feature information of the fine-grained nodes, so that the acquired target semantic feature information of each fine-grained node has both the semantic feature information of the fine-grained node and the semantic feature information of the coarse-grained node, thereby obtaining the multi-granularity semantic feature information corresponding to the document image. Therefore, the accuracy of understanding a document is improved, and the multi-modality information expression with richer semantics is provided for subsequent information extraction and classification of the document image.

In order to improve the accuracy of expressing the semantic feature information, another embodiment is provided in the disclosure.

Figure 5:
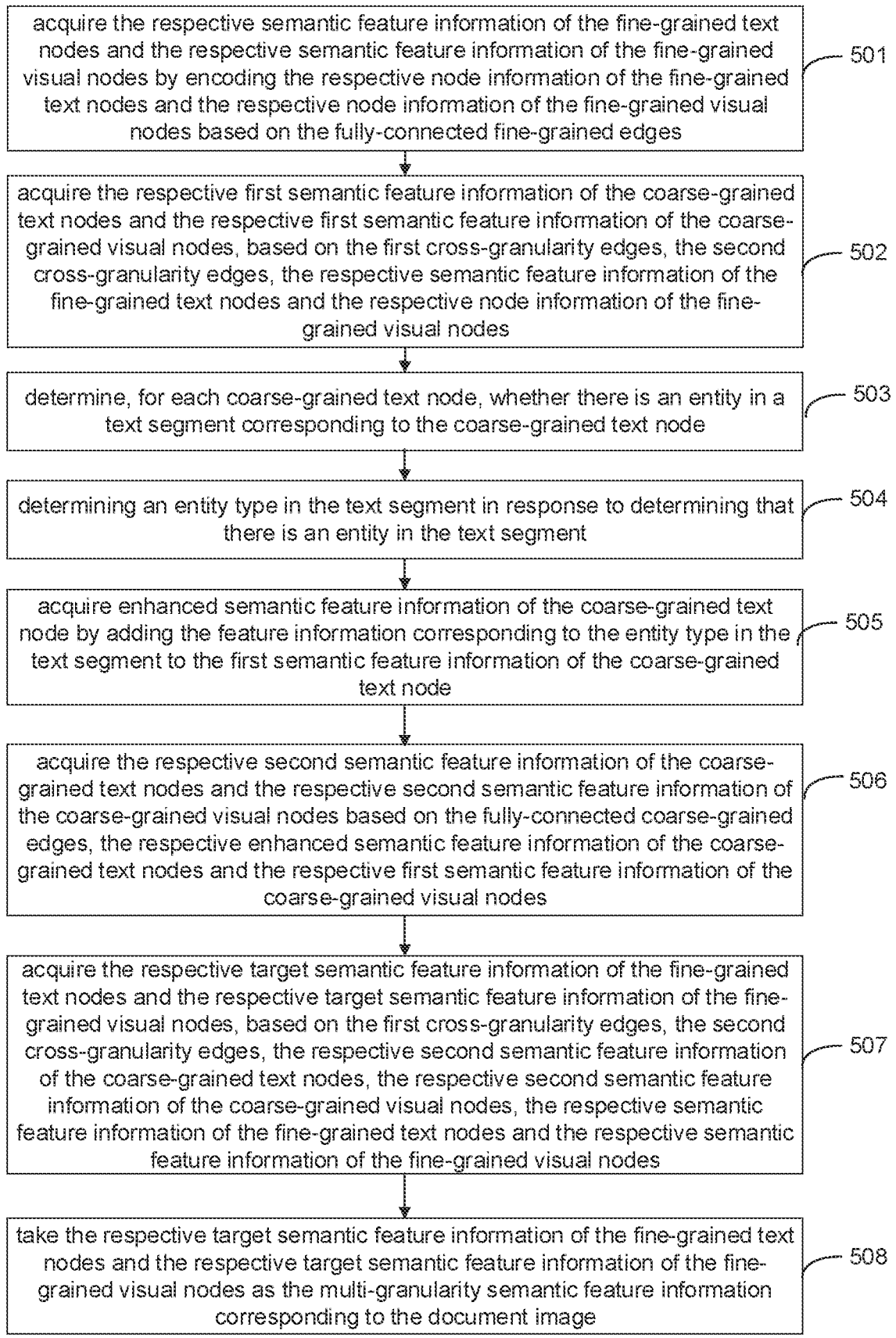
FIG. 5 is a diagram illustrating a fifth embodiment of the disclosure.

FIG. 5 is a flowchart illustrating determining the multi-granularity semantic feature information of a document image according to embodiments of the disclosure. As illustrated in FIG. 5, on the basis of the above embodiments, an implementation process of step 104 in FIG. 1 may include the following.

At step 501, respective semantic feature information of the fine-grained text nodes and respective semantic feature information of the fine-grained visual nodes are acquired by encoding the respective node information of the fine-grained text nodes and the respective node information of the fine-grained visual nodes based on the fully-connected fine-grained edges.

At step 502, respective first semantic feature information of the coarse-grained text nodes and respective first semantic feature information of the coarse-grained visual nodes are acquired, based on the first cross-granularity edges, the second cross-granularity edges, the respective semantic feature information of the fine-grained text nodes and the respective node information of the fine-grained visual nodes.

At step 503, for each coarse-grained text node, it is determined whether there is an entity in a text segment corresponding to the coarse-grained text node.

In some embodiments, it can be determined through an entity recognition algorithm in the related art, whether there is an entity in a text segment corresponding to each coarse-grained text node. The entity may be contents corresponding to entity types such as name, telephone, and mailbox.

At step 504, an entity type of the entity in the text segment is determined in response to determining that there is an entity in the text segment.

At step 505, enhanced semantic feature information of the coarse-grained text node is acquired by adding feature information corresponding to the entity type in the text segment to the first semantic feature information of the coarse-grained text node.

It is understandable that, since for each coarse-grained text node, the first semantic feature information of the coarse-grained text node is obtained based on the respective semantic feature information of the fine-grained text nodes included in the coarse-grained text node, but the respective semantic feature information of the fine-grained text nodes cannot reflect the entity relationship, in order to improve the accuracy of the semantic feature information of each coarse-grained text node, the entity feature information corresponding to the coarse-grained text node may be added to the first semantic feature information, to enhance the first semantic feature information of the coarse-grained text node, thereby obtaining enhanced semantic feature information of the coarse-grained text node.

In some embodiments, a corresponding vector representation may be preset for each entity type, and the feature information corresponding to the entity type in the text segment is the vector representation corresponding to the entity type in the text segment.

At step 506, the respective second semantic feature information of the coarse-grained text nodes and the respective second semantic feature information of the coarse-grained visual nodes are acquired based on the fully-connected coarse-grained edges, the respective enhanced semantic feature information of the coarse-grained text nodes and the respective first semantic feature information of the coarse-grained visual nodes.

At step 507, respective target semantic feature information of the fine-grained text nodes and respective target semantic feature information of the fine-grained visual nodes are acquired, according to the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes.

At step 508, the respective target semantic feature information of the fine-grained text nodes and the respective target semantic feature information of the fine-grained visual nodes are taken as the multi-granularity semantic feature information corresponding to the document image.

With the method for processing the document image according to embodiments of the disclosure, for each coarse-grained text node, the entity recognition is performed on the text segment corresponding to the coarse-grained text node, so that feature information of the entity type in the text segment is added to the first semantic feature information of the coarse-grained text node to obtain the enhanced semantic feature information of the coarse-grained text node, so that the accuracy of the obtained the second semantic feature information of the coarse-grained text node and the second semantic feature information of the coarse-grained visual node may be improved, and the accuracy of the multi-granularity semantic feature information corresponding to the obtained document image may be further improved.

Figure 6:
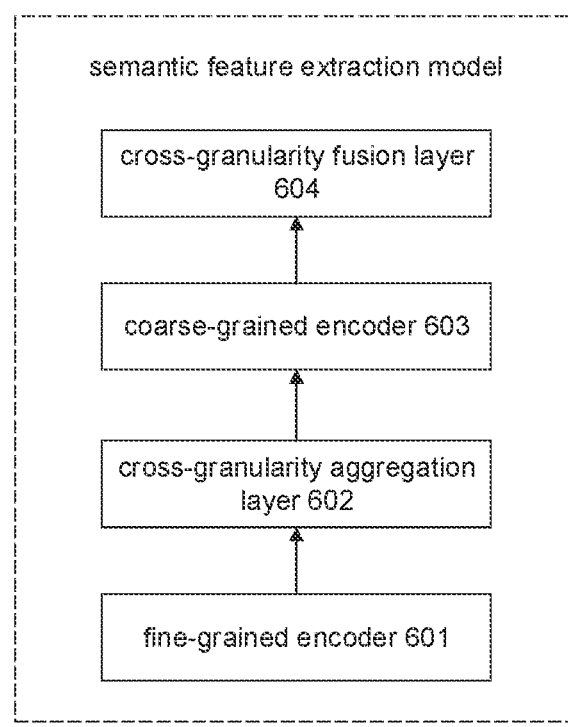
FIG. 6 is a schematic diagram illustrating a structure of a semantic feature extraction model according to the embodiment of the disclosure.

In another embodiments, step 104 in FIG. 1 may also be implemented by a preset semantic feature extraction model. FIG. 6 is a schematic diagram illustrating a semantic feature extraction model according to embodiments of the disclosure. As illustrated in FIG. 6, the model includes a fine-grained encoder 601, a cross-granularity aggregation layer 602, a coarse-grained encoder 603 and a cross-granularity fusion layer 604. The feature extraction model has learned relationships between all nodes based on the multi-granularity and multi-modality document graph, and the feature extraction model has learned a capability of performing semantic feature extraction on the document image based on the node information of the document image.

Figure 7:
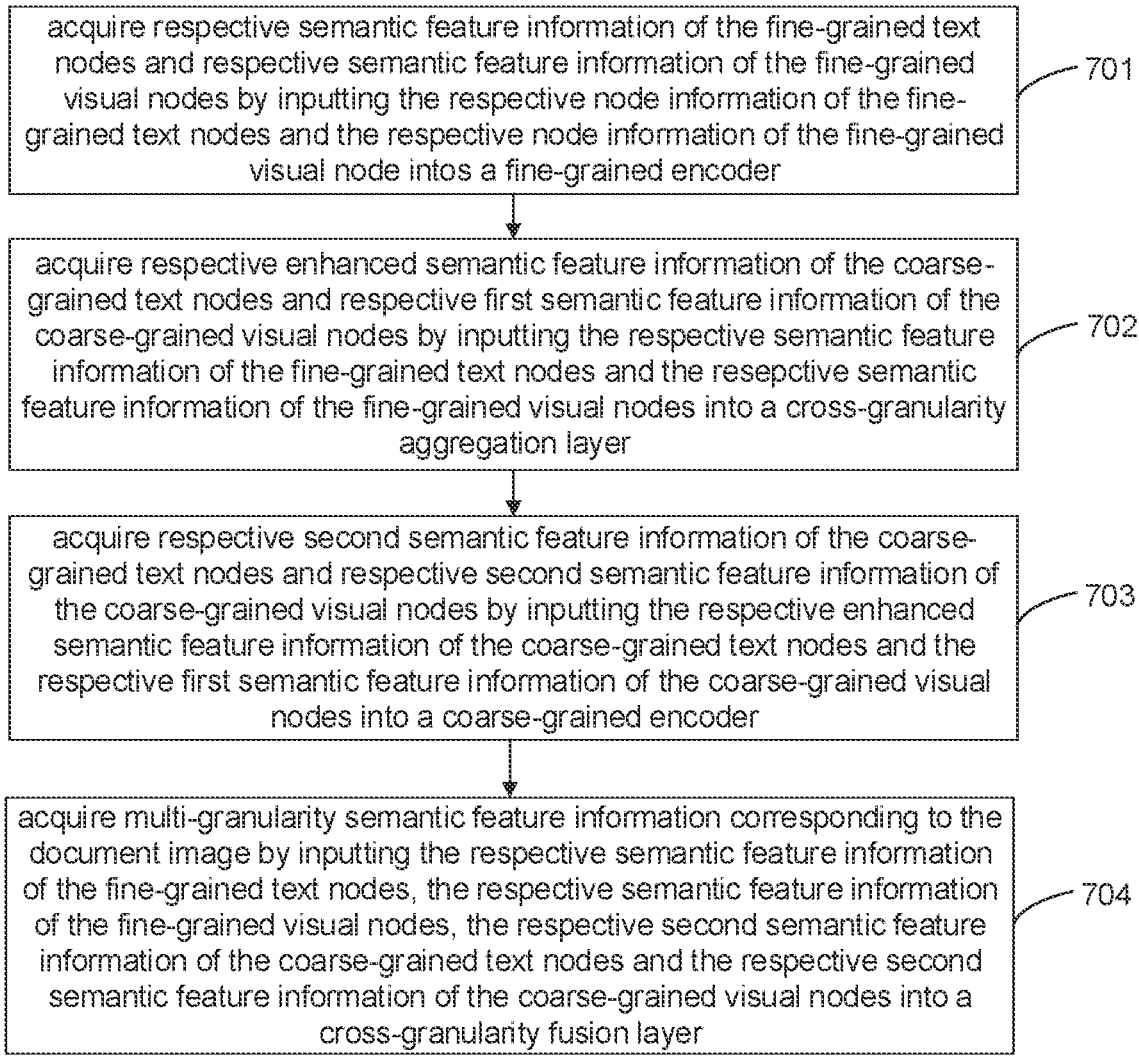
FIG. 7 is a diagram illustrating a sixth embodiment of the disclosure.

As an implementation, FIG. 7 is another flowchart illustrating acquiring multi-granularity semantic feature information corresponding to a document image according to embodiments of the disclosure. As illustrated in FIG. 7, on the basis of the above embodiments, the implementation process of step 104 in FIG. 1 includes the following.

At step 701, the respective semantic feature information of the fine-grained text nodes and the respective semantic feature information of the fine-grained visual nodes are acquired by inputting the respective node information of the fine-grained text nodes and the respective node information of the fine-grained visual nodes into the fine-grained encoder.

In some embodiments, the fine-grained encoder may be a transformer encoder, or another model for achieving the encoding process. The respective node information of the fine-grained text nodes and the respective node information of the fine-grained visual nodes can form a sequence and inputted into the fine-grained encoder, such that the fine-grained encoder encodes the respective semantic feature information of the fine-grained nodes, and the respective semantic feature information of the fine-grained text nodes and the respective semantic feature information of the fine-grained visual nodes are obtained based on the encoded semantic feature information in combination with respective node information of the fine-grained nodes.

At step 702, respective enhanced semantic feature information of the coarse-grained text nodes and respective first semantic feature information of the coarse-grained visual nodes are acquired by inputting the respective semantic feature information of the fine-grained text nodes and the respective semantic feature information of the fine-grained visual nodes into the cross-granularity aggregation layer.

In some embodiments, the cross-granularity aggregation layer may determine, for each coarse-grained text node and for each coarse-grained visual node, target fine-grained text nodes included in the coarse-grained text node and target fine-grained visual nodes included in the coarse-grained visual node based on the first cross-granularity edges and the second cross-granularity edges, aggregate the respective semantic feature information of the target fine-grained text nodes to obtain the first semantic feature information of the coarse-grained text node and aggregate the respective semantic feature information of the target fine-grained visual nodes to obtain the first semantic feature information of the coarse-grained visual node. Meanwhile, the cross-granularity aggregation layer may further perform, for each coarse-grained text node, the entity recognition on the text segment corresponding to the coarse-grained text node, to enhance the first semantic feature information of the coarse-grained text node, to obtain the enhanced semantic feature information of the coarse-grained text node.

At step 703, respective second semantic feature information of the coarse-grained text nodes and respective second semantic feature information of the coarse-grained visual nodes are acquired by inputting the respective enhanced semantic feature information of the coarse-grained text nodes and the respective first semantic feature information of the coarse-grained visual nodes into the coarse-grained encoder.

In some embodiments, the coarse-grained encoder may be a standard Transformer encoder configured to encode the respective enhanced semantic feature information of the coarse-grained text nodes and the respective first semantic feature information of the coarse-grained visual nodes, to extract the respective second semantic feature information of the coarse-grained text nodes and the respective second semantic feature information of the coarse-grained visual nodes.

At step 704, the multi-granularity semantic feature information corresponding to the document image may be acquired by inputting the respective semantic feature information of the fine-grained text nodes, the respective semantic feature information of the fine-grained visual nodes, the respective second semantic feature information of the coarse-grained text nodes and the respective second semantic feature information of the coarse-grained visual nodes into the cross-granularity fusion layer.

In some embodiments, the cross-granularity fusion layer may determine, for each fine-grained text node and for each fine-grained visual node, based on the first cross-granularity edges and the second cross-granularity edges, a coarse-grained text node to which the fine-grained text node belongs and a coarse-grained visual node to which the fine-grained visual node belongs, perform fusion processing on the semantic feature information of the fine-grained text node and the second semantic feature information of the corresponding coarse-grained text node to obtain the target semantic feature information of the fine-grained text node, perform fusion processing on the semantic feature information of the fine-grained visual node and the second semantic feature information of the coarse-grained visual node to obtain the target semantic feature information of the fine-grained visual node, and take the target semantic feature information of the fine-grained text node and the target semantic feature information of the fine-grained visual node as the multi-granularity semantic feature information corresponding to the document image.

In order to achieve the above embodiment, an apparatus for processing a document image is provided in the disclosure.

Figure 8:
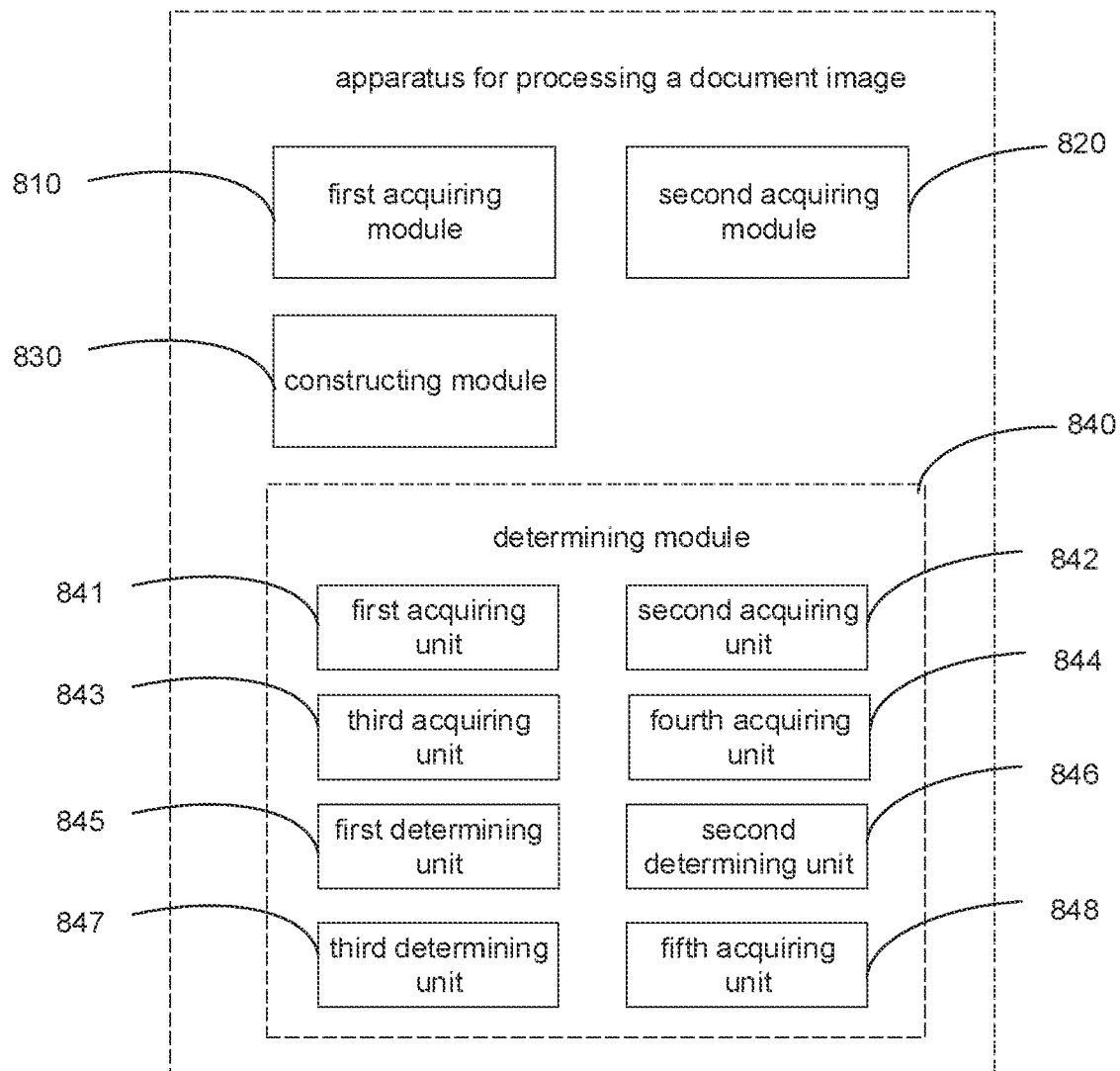
FIG. 8 is a diagram illustrating a seventh embodiment of the disclosure.

FIG. 8 is a block diagram illustrating a structure of an apparatus for processing a document image according to embodiments of the disclosure. As illustrated in FIG. 8, the apparatus includes a first acquiring module 810, a second acquiring module 820, a constructing module 830 and a determining module 840.

The first acquiring module 810 is configured to acquire a document image to be processed.

The second acquiring module 820 is configured to acquire text nodes of multiple granularities, visual nodes of multiple granularities, respective node information of the text nodes, and respective node information of the visual nodes from the document image.

The constructing module 830 is configured to construct a multi-granularity and multi-modality document graph based on the text nodes of multiple granularities, the visual nodes of multiple granularities, the respective node information of the text nodes, and the respective node information of the visual nodes.

The determining module 840 is configured to determine multi-granularity semantic feature information of the document image based on the multi-granularity and multi-modality document graph, the respective node information of the text nodes and the respective node information of the visual nodes.

In some embodiments, the second acquiring module 820 is configured to:
  acquire fine-grained text nodes and respective node information of the fine-grained text nodes by performing text recognition on the document image by taking a character as a granularity;
  acquire coarse-grained text nodes and respective node information of the coarse-grained text nodes by performing text recognition on the document image by taking a text segment as a granularity;
  acquire fine-grained visual nodes and respective node information of the fine-grained visual nodes by performing image segmentation on the document image; and
  acquire coarse-grained visual nodes and respective node information of the coarse-grained visual nodes by performing salient visual area recognition on the document image.

As a possible implementation, the constructing module 830 is configured to:
  connect each two nodes of the fine-grained nodes to construct fully-connected fine-grained edges, based on the fine-grained text nodes, the respective node information of the fine-grained text nodes, the fine-grained visual nodes and the respective node information of the fine-grained visual nodes; in which the fine-grained nodes are all of the fine-grained text nodes and the fine-grained visual nodes;
  connect each two nodes of coarse-grained nodes to construct fully-connected coarse-grained edges based on the coarse-grained text nodes, the respective node information of the coarse-grained text nodes, the coarse-grained visual nodes and the respective node information of the coarse-grained text nodes; in which the coarse-grained nodes are all of the coarse-grained text nodes and the coarse-grained visual nodes;
  connect each fine-grained text node and a coarse-grained text node to which the fine-grained text node belongs to construct first cross-granularity edges based on the respective node information of the fine-grained text nodes and the respective node information of the coarse-grained text nodes;

connect each fine-grained visual node and a coarse-grained visual node to which the fine-grained visual node belongs to construct second cross-granularity edges based on the respective node information of the fine-grained visual nodes and the respective node information of the coarse-grained visual nodes; and acquire the multi-granularity and multi-modality document graph based on the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

In some embodiments, the determining module 840 includes a first acquiring unit 841, a second acquiring unit 842, a third acquiring unit 843, a fourth acquiring unit 844 and a first determining unit 845.

The first acquiring unit 841 is configured to acquire respective semantic feature information of the fine-grained text nodes and respective semantic feature information of the fine-grained visual nodes by encoding respectively the respective node information of the fine-grained text nodes and the respective node information of the fine-grained visual nodes based on the fully-connected fine-grained edges.

The second acquiring unit 842 is configured to acquire respective first semantic feature information of the coarse-grained text nodes and respective first semantic feature information of the coarse-grained visual nodes, based on the first cross-granularity edges, the second cross-granularity edges, the respective semantic feature information of the fine-grained text nodes and the respective node information of the fine-grained visual nodes.

The third acquiring unit 843 is configured to acquire respective second semantic feature information of the coarse-grained text nodes and respective second semantic feature information of the coarse-grained visual nodes based on the fully-connected coarse-grained edges, the respective first semantic feature information of the coarse-grained text nodes and the respective first semantic feature information of the coarse-grained visual nodes.

The fourth acquiring unit 844 is configured to acquire respective target semantic feature information of the fine-grained text nodes and respective target semantic feature information of the fine-grained visual nodes, according to the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes.

The first determining unit 845 is configured to take the respective target semantic feature information of the fine-grained text nodes and the respective target semantic feature information of the fine-grained visual nodes as the multi-granularity semantic feature information corresponding to the document image.

The second acquiring unit 842 is configured to:

for each coarse-grained text node, acquire the first semantic feature information of the coarse-grained text node by determining fine-grained text nodes connected to the coarse-grained text node based on the first cross-granularity edges, and aggregating the respective semantic feature information of the target fine-grained text nodes; and for each coarse-grained visual node, acquire the first semantic feature information of coarse-grained visual node by determining fine-grained visual nodes connected to the coarse-grained visual node based on the second cross-granularity edges, and aggregating the respective semantic feature information of the target fine-grained visual nodes.

As an implementation, the fourth acquiring unit 844 is configured to:

for each fine-grained text node, acquire the target semantic feature information of the fine-grained text node by determining a target coarse-grained text node to which the fine-grained text node belongs based on the first cross-granularity edges and by performing fusion processing on the semantic feature information of the fine-grained text node and the second semantic feature information of the target coarse-grained text node; and for each fine-grained visual node, acquire the target semantic feature information of the fine-grained visual node by determining a target coarse-grained visual node to which the fine-grained visual node belongs based on the second cross-granularity edges and by performing fusion processing on the semantic feature information of the fine-grained visual node and the second semantic feature information of the target coarse-grained visual node.

In another embodiments, the determining module 840 further includes a second determining unit 846, a third determining unit 847 and a fifth acquiring unit 848.

The second determining unit 846 is configured to determine for each coarse-grained text node, whether there is an entity in a text segment corresponding to the coarse-grained text node.

The third determining unit 847 is configured to determine an entity type in the text segment in response to determining that there is an entity in the text segment.

The fifth acquiring unit 848 is configured to acquire enhanced semantic feature information of the coarse-grained text node by adding the feature information corresponding to the entity type in the text segment to the first semantic feature information of the coarse-grained text node.

The third acquiring unit 843 is configured to:

acquire the respective semantic feature information of the coarse-grained text nodes and the respective second semantic feature information of the coarse-grained visual nodes based on the fully-connected coarse-grained edges, the respective enhanced semantic feature information of the coarse-grained text nodes and the respective first semantic feature information of the coarse-grained visual nodes.

With the apparatus for processing a document content according to embodiments of the disclosure, the multi-granularity and multi-modality document graph is constructed by acquiring the text nodes of the multiple granularities, the visual nodes of multiple granularities, the respective node information of the text nodes, and the respective node information of the visual nodes in the document image, to determine the multi-granularity semantic feature information of the document image based on the multi-granularity and multi-modality document graph, the respective node information of the text nodes and the respective node information of the visual nodes. Therefore, elements of different granularities in the document image are considered and the complex relationships between the elements of different granularities and different modalities are represented by the multi-granularity and multi-modality document graph, so that the acquired semantic feature information is richer and more comprehensive, thereby comprehensively representing visually-rich document information of the document image, to improve the accuracy of understanding a document.

Figure 9:
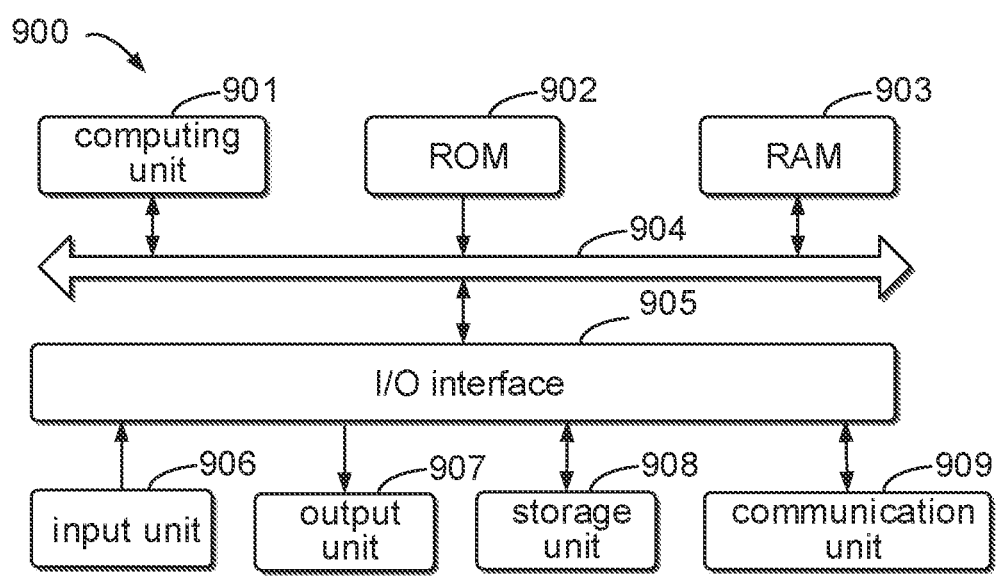
FIG. 9 is a block diagram illustrating a structure of an electronic device configured to implement a method for processing a document image in embodiments of the disclosure.

An electronic device, a readable storage medium and a computer program product are further provided according to embodiments of the disclosure FIG. 9 is a schematic block diagram illustrating an example electronic device 900 in the embodiment of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 9, a device 900 includes a computing unit 901, configured to execute various appropriate actions and processes according to a computer program stored in a read-only memory (ROM) 902 or loaded from a storage unit 908 to a random access memory (RAM) 903. In a RAM 903, various programs and data required for a device 900 may be stored. The computing unit 901, the ROM 902 and the RAM 903 may be connected with each other by a bus 904. An input/output (I/O) interface 905 is also connected to the bus 904.

A plurality of components in the device 900 are connected to an I/O interface 905, and includes: an input unit 906, for example, a keyboard, a mouse, etc.; an output unit 907, for example various types of displays, speakers; a storage unit 908, for example a magnetic disk, an optical disk; and a communication unit 909, for example, a network card, a modem, a wireless transceiver. The communication unit 909 allows the device 900 to exchange information/data through a computer network such as internet and/or various types of telecommunication networks and other devices.

The computing unit 901 may be various types of general and/or dedicated processing components with processing and computing ability. Some examples of the computing unit 901 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 901 executes various methods and processes as described above, and for example, a method for processing a document image. For example, in some embodiments, the method for processing a document image may be further implemented as a computer software program, which is physically contained in a machine readable medium, such as a storage unit 908. In some embodiments, a part or all of the computer program may be loaded and/or installed on the device 900 through the ROM 902 and/or a communication unit 909. When the computer program is loaded on the RAM 903 and executed by the computing unit 901, one or more steps in the method for processing a document image as described above may be performed. Alternatively, in other embodiments, the computing unit 901 may be configured to execute a method for processing a document image in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. The machine-readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, and further may be a server with a distributed system, or a server in combination with a blockchain.

In the technical solution of the disclosure, the text nodes of multiple granularities, the visual nodes of multiple granularities, the respective node information of the text nodes and the respective node information of the visual nodes are acquired from a document image to be processed, and the multi-granularity and multi-modality document graph is constructed based on the text nodes, the visual nodes, the respective node information of the text nodes and the respective node information of the visual nodes, and the multi-granularity semantic feature information of the document image is determined based on the multi-granularity and multi-modality document graph, the respective node information of the text nodes and the respective node information of the visual nodes. In the solution, the multi-granularity elements in the document image are considered and a complex relationship between elements of different granularities and different modalities is represented by the multi-granularity and multi-modality document graph, such that the acquired semantic feature information is richer and more comprehensive, thereby comprehensively representing visually-rich document information of the document image, to improve the accuracy of understanding a document.

It is understandable that, various forms of procedures shown above may be configured to reorder, add or delete blocks. For example, blocks described in the disclosure may be executed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

What is claimed is:

1. A method for processing a document image, comprising:
   acquiring a document image;
   performing text recognition on the document image with an Optical Character Recognition (OCR) technology to acquire text nodes of multiple granularities, visual nodes of multiple granularities, respective node information of the text nodes, and respective node information of the visual nodes, wherein the node information of the text nodes comprises position information of the text nodes, and the node information of the visual nodes comprises position information of the visual nodes;
   constructing a multi-granularity and multi-modality document graph based on the text nodes, the visual nodes, the respective node information of the text nodes, and the respective node information of the visual nodes; and
   determining, by a semantic feature extraction model, multi-granularity semantic feature information of the document image based on the multi-granularity and multi-modality document graph, the respective node information of the text nodes, and the respective node information of the visual nodes, wherein the semantic feature extraction model comprises an encoder, an aggregation layer, and a fusion layer.

2. The method of claim 1, wherein acquiring the text nodes of multiple granularities, the visual nodes of multiple granularities, the respective node information of the text nodes, and the respective node information of the visual nodes from the document image comprises:
   acquiring fine-grained text nodes and respective node information of the fine-grained text nodes by performing text recognition on the document image by taking a character as a granularity;
   acquiring coarse-grained text nodes and respective node information of the coarse-grained text nodes by performing text recognition on the document image by taking a text segment as a granularity;
   acquiring fine-grained visual nodes and respective node information of the fine-grained visual nodes by performing image segmentation on the document image; and
   acquiring coarse-grained visual nodes and respective node information of the coarse-grained visual nodes by performing salient visual area recognition on the document image.

3. The method of claim 2, wherein constructing the multi-granularity and multi-modality document graph based on the text nodes, the visual nodes, the respective node information of the text nodes, and the respective node information of the visual nodes comprises:
   connecting each two of fine-grained nodes based on the fine-grained text nodes, the respective node information of the fine-grained text nodes, the fine-grained visual nodes, and the respective node information of the fine-grained visual nodes, to construct fully-connected fine-grained edges, wherein the fine-grained nodes are all of the fine-grained text nodes and the find-grained visual nodes;
   connecting each two of coarse-grained nodes based on the coarse-grained text nodes, the respective node information of the coarse-grained text nodes, the coarse-grained visual nodes, and the respective node information of the coarse-grained visual nodes, to construct fully-connected coarse-grained edges, wherein the coarse-grained nodes are all of the coarse-grained text nodes and the coarse-grained visual nodes;

connecting each fine-grained text node with a coarse-grained text node to which the fine-grained text node belongs, based on the respective node information of the fine-grained text nodes and the respective node information of the coarse-grained text nodes, to construct first cross-granularity edges;

connecting each fine-grained visual node with a coarse-grained visual node to which the fine-grained visual node belongs, based on the respective node information of the fine-grained visual nodes and the respective node information of the coarse-grained visual nodes, to construct second cross-granularity edges; and acquiring the multi-granularity and multi-modality document graph based on the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

4. The method of claim 3, wherein determining the multi-granularity semantic feature information of the document image based on the multi-granularity and multi-modality document graph, the respective node information of the text nodes and the respective node information of the visual nodes comprises:

acquiring respective semantic feature information of the fine-grained text nodes and respective semantic feature information of the fine-grained visual nodes by encoding the respective node information of the fine-grained text nodes and the respective node information of the fine-grained visual nodes by the fully-connected fine-grained edges;

acquiring respective first semantic feature information of the coarse-grained text nodes and respective first semantic feature information of the coarse-grained visual nodes, based on the first cross-granularity edges, the second cross-granularity edges, the respective semantic feature information of the fine-grained text nodes and the respective semantic feature information of the fine-grained visual nodes;

acquiring respective second semantic feature information of the coarse-grained text nodes and respective second semantic feature information of the coarse-grained visual nodes based on the fully-connected coarse-grained edges, the respective first semantic feature information of the coarse-grained text nodes and the respective first semantic feature information of the coarse-grained visual nodes;

acquiring respective target semantic feature information of the fine-grained text nodes and respective target semantic feature information of the fine-grained visual nodes, based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes; and taking the respective target semantic feature information of the fine-grained text nodes and the respective target semantic feature information of the fine-grained visual nodes as the multi-granularity semantic feature information corresponding to the document image.

5. The method of claim 4, wherein acquiring the respective first semantic feature information of the coarse-grained text nodes and the respective first semantic feature information of the coarse-grained visual nodes based on the first cross-granularity edges, the second cross-granularity edges, the respective semantic feature information of the fine-grained text nodes and the respective semantic feature information of the fine-grained visual nodes comprises:

for each coarse-grained text node, acquiring the first semantic feature information of the coarse-grained text node by determining, based on the first cross-granularity edges, target fine-grained text nodes respectively connected to the coarse-grained text node and aggregating respective semantic feature information of the target fine-grained text nodes; and for each coarse-grained visual node, acquiring the first semantic feature information of the coarse-grained visual node by determining, based on the second cross-granularity edges, target fine-grained visual nodes respectively connected to the coarse-grained visual node and aggregating respective semantic feature information of the target fine-grained visual node.

6. The method of claim 4, wherein acquiring the respective target semantic feature information of the fine-grained text nodes and the respective target semantic feature information of the fine-grained visual nodes based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes comprises:

for each fine-grained text node, acquiring the target semantic feature information the fine-grained text node, by determining, based on the first cross-granularity edges, a target coarse-grained text node to which the fine-grained text node belongs, and performing fusion processing on the semantic feature information of the fine-grained text node and the second semantic feature information of the target coarse-grained text node; and for each fine-grained visual node, acquiring the target semantic feature information of the fine-grained visual node, by determining, based on the second cross-granularity edges, a target coarse-grained visual node to which the fine-grained visual node belongs, and performing fusion processing on the semantic feature information of the fine-grained visual node and the second semantic feature information of the target coarse-grained visual node.

7. The method of claim 4, further comprising: for each coarse-grained text node, determining whether there is an entity in a text segment corresponding to the coarse-grained text node;

determining an entity type of the entity contained in the text segment in response to determining that there is an entity in the text segment; and acquiring enhanced semantic feature information of the coarse-grained text node by adding feature information corresponding to the entity type to the first semantic feature information of the coarse-grained text node;

wherein acquiring the respective second semantic feature information of the coarse-grained text nodes and the respective second semantic feature information of the coarse-grained visual nodes based on the fully-connected coarse-grained edges, the respective first semantic feature information of the coarse-grained text nodes and the respective first semantic feature information of the coarse-grained visual nodes comprises:

acquiring the respective second semantic feature information of the coarse-grained text nodes and the respective second semantic feature information of the coarse-grained visual nodes based on the fully-connected coarse-grained edges, the respective enhanced semantic feature information of the coarse-grained text nodes and the respective first semantic feature information of the coarse-grained visual nodes.

8. An electronic device, comprising:
at least one processor; and
a memory communicatively connected to the at least one processor; wherein,
the memory stores instructions executable by the at least one processor, wherein when the instructions are executed by the at least one processor, the at least one processor is configured to:
acquire a document image;
perform text recognition on the document image with an Optical Character Recognition (OCR) technology to acquire text nodes of multiple granularities, visual nodes of multiple granularities, respective node information of the text nodes, and respective node information of the visual nodes, wherein the node information of the text nodes comprises position information of the text nodes, and the node information of the visual nodes comprises position information of the visual nodes;
construct a multi-granularity and multi-modality document graph based on the text nodes, the visual nodes, the respective node information of the text nodes, and the respective node information of the visual nodes; and
determine, by a semantic feature extraction model, multi-granularity semantic feature information of the document image based on the multi-granularity and multi-modality document graph, the respective node information of the text nodes, and the respective node information of the visual nodes, wherein the semantic feature extraction model comprises an encoder, an aggregation layer, and a fusion layer.

9. The electronic device of claim 8, wherein the at least one processor is configured to:
acquire fine-grained text nodes and respective node information of the fine-grained text nodes by performing text recognition on the document image by taking a character as a granularity;
acquire coarse-grained text nodes and respective node information of the coarse-grained text nodes by performing text recognition on the document image by taking a text segment as a granularity;
acquire fine-grained visual nodes and respective node information of the fine-grained visual nodes by performing image segmentation on the document image; and
acquire coarse-grained visual nodes and respective node information of the coarse-grained visual nodes by performing salient visual area recognition on the document image.

10. The electronic device of claim 9, wherein the at least one processor is configured to:
connect each two of fine-grained nodes based on the fine-grained text nodes, the respective node information of the fine-grained text nodes, the fine-grained visual nodes, and the respective node information of the fine-grained visual nodes, to construct fully-connected fine-grained edges, wherein the fine-grained nodes are all of the fine-grained text nodes and the find-grained visual nodes;
connect each two of coarse-grained nodes based on the coarse-grained text nodes, the respective node information of the coarse-grained text nodes, the coarse-grained visual nodes, and the respective node information of the coarse-grained visual nodes, to construct fully-connected coarse-grained edges, wherein the coarse-grained nodes are all of the coarse-grained text nodes and the coarse-grained visual nodes;
connect each fine-grained text node with a coarse-grained text node to which the fine-grained text node belongs, based on the respective node information of the fine-grained text nodes and the respective node information of the coarse-grained text nodes, to construct first cross-granularity edges;
connect each fine-grained visual node with a coarse-grained visual node to which the fine-grained visual node belongs, based on the respective node information of the fine-grained visual nodes and the respective node information of the coarse-grained visual nodes, to construct second cross-granularity edges; and
acquire the multi-granularity and multi-modality document graph based on the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

11. The electronic device of claim 10, wherein the at least one processor is configured to:
acquire respective semantic feature information of the fine-grained text nodes and respective semantic feature information of the fine-grained visual nodes by encoding the respective node information of the fine-grained text nodes and the respective node information of the fine-grained visual nodes by the fully-connected fine-grained edges;
acquire respective first semantic feature information of the coarse-grained text nodes and respective first semantic feature information of the coarse-grained visual nodes, based on the first cross-granularity edges, the second cross-granularity edges, the respective semantic feature information of the fine-grained text nodes and the respective semantic feature information of the fine-grained visual nodes;
acquire respective second semantic feature information of the coarse-grained text nodes and respective second semantic feature information of the coarse-grained visual nodes based on the fully-connected coarse-grained edges, the respective first semantic feature information of the coarse-grained text nodes and the respective first semantic feature information of the coarse-grained visual nodes;
acquire respective target semantic feature information of the fine-grained text nodes and respective target semantic feature information of the fine-grained visual nodes, based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes; and take the respective target semantic feature information of the fine-grained text nodes and the respective target semantic feature information of the fine-grained visual nodes as the multi-granularity semantic feature information corresponding to the document image.

12. The electronic device of claim 11, wherein the at least one processor is configured to:
for each coarse-grained text node, acquire the first semantic feature information of the coarse-grained text node by determining, based on the first cross-granularity edges, target fine-grained text nodes respectively connected to the coarse-grained text node and aggregating respective semantic feature information of the target fine-grained text nodes; and
for each coarse-grained visual node, acquire the first semantic feature information of the coarse-grained visual node by determining, based on the second cross-granularity edges, target fine-grained visual nodes respectively connected to the coarse-grained visual node and aggregating respective semantic feature information of the target fine-grained visual node.

13. The electronic device of claim 11, wherein the at least one processor is configured to:
for each fine-grained text node, acquire the target semantic feature information the fine-grained text node, by determining, based on the first cross-granularity edges, a target coarse-grained text node to which the fine-grained text node belongs, and performing fusion processing on the semantic feature information of the fine-grained text node and the second semantic feature information of the target coarse-grained text node; and
for each fine-grained visual node, acquire the target semantic feature information of the fine-grained visual node, by determining, based on the second cross-granularity edges, a target coarse-grained visual node to which the fine-grained visual node belongs, and performing fusion processing on the semantic feature information of the fine-grained visual node and the second semantic feature information of the target coarse-grained visual node.

14. The electronic device of claim 11, wherein the at least one processor is further configured to: for each coarse-grained text node,
determine whether there is an entity in a text segment corresponding to the coarse-grained text node;
determine an entity type of the entity contained in the text segment in response to determining that there is an entity in the text segment; and
acquire enhanced semantic feature information of the coarse-grained text node by adding feature information corresponding to the entity type to the first semantic feature information of the coarse-grained text node;
wherein the at least one processor is configured to:
acquire the respective second semantic feature information of the coarse-grained text nodes and the respective second semantic feature information of the coarse-grained visual nodes based on the fully-connected coarse-grained edges, the respective enhanced semantic feature information of the coarse-grained text nodes and the respective first semantic feature information of the coarse-grained visual nodes.

15. A non-transitory computer-readable storage medium having computer instructions stored thereon, wherein the computer instructions are configured to cause a computer to perform a method for processing a document image, the method comprising:

acquiring a document image;
performing text recognition on the document image with an Optical Character Recognition (OCR) technology to acquire text nodes of multiple granularities, visual nodes of multiple granularities, respective node information of the text nodes, and respective node information of the visual nodes, wherein the node information of the text nodes comprises position information of the text nodes, and the node information of the visual nodes comprises position information of the visual nodes;
constructing a multi-granularity and multi-modality document graph based on the text nodes, the visual nodes, the respective node information of the text nodes, and the respective node information of the visual nodes; and
determining, by a semantic feature extraction model, multi-granularity semantic feature information of the document image based on the multi-granularity and multi-modality document graph, the respective node information of the text nodes, and the respective node information of the visual nodes, wherein the semantic feature extraction model comprises an encoder, an aggregation layer, and a fusion layer.

16. The non-transitory computer-readable storage medium of claim 15, wherein acquiring the text nodes of multiple granularities, the visual nodes of multiple granularities, the respective node information of the text nodes, and the respective node information of the visual nodes from the document image comprises:
acquiring fine-grained text nodes and respective node information of the fine-grained text nodes by performing text recognition on the document image by taking a character as a granularity;
acquiring coarse-grained text nodes and respective node information of the coarse-grained text nodes by performing text recognition on the document image by taking a text segment as a granularity;
acquiring fine-grained visual nodes and respective node information of the fine-grained visual nodes by performing image segmentation on the document image; and
acquiring coarse-grained visual nodes and respective node information of the coarse-grained visual nodes by performing salient visual area recognition on the document image.

17. The non-transitory computer-readable storage medium of claim 16, wherein constructing the multi-granularity and multi-modality document graph based on the text nodes, the visual nodes, the respective node information of the text nodes, and the respective node information of the visual nodes comprises:
connecting each two of fine-grained nodes based on the fine-grained text nodes, the respective node information of the fine-grained text nodes, the fine-grained visual nodes, and the respective node information of the fine-grained visual nodes, to construct fully-connected fine-grained edges, wherein the fine-grained nodes are all of the fine-grained text nodes and the find-grained visual nodes;
connecting each two of coarse-grained nodes based on the coarse-grained text nodes, the respective node information of the coarse-grained text nodes, the coarse-grained visual nodes, and the respective node information of the coarse-grained visual nodes, to construct fully-connected coarse-grained edges, wherein the coarse-grained nodes are all of the coarse-grained text nodes and the coarse-grained visual nodes;

connecting each fine-grained text node with a coarse-grained text node to which the fine-grained text node belongs, based on the respective node information of the fine-grained text nodes and the respective node information of the coarse-grained text nodes, to construct first cross-granularity edges;

connecting each fine-grained visual node with a coarse-grained visual node to which the fine-grained visual node belongs, based on the respective node information of the fine-grained visual nodes and the respective node information of the coarse-grained visual nodes, to construct second cross-granularity edges; and acquiring the multi-granularity and multi-modality document graph based on the fine-grained text nodes, the coarse-grained text nodes, the fine-grained visual nodes, the coarse-grained visual nodes, the fully-connected fine-grained edges, the fully-connected coarse-grained edges, the first cross-granularity edges and the second cross-granularity edges.

18. The non-transitory computer-readable storage medium of claim 17, wherein determining the multi-granularity semantic feature information of the document image based on the multi-granularity and multi-modality document graph, the respective node information of the text nodes and the respective node information of the visual nodes comprises:

acquiring respective semantic feature information of the fine-grained text nodes and respective semantic feature information of the fine-grained visual nodes by encoding the respective node information of the fine-grained text nodes and the respective node information of the fine-grained visual nodes by the fully-connected fine-grained edges;

acquiring respective first semantic feature information of the coarse-grained text nodes and respective first semantic feature information of the coarse-grained visual nodes, based on the first cross-granularity edges, the second cross-granularity edges, the respective semantic feature information of the fine-grained text nodes and the respective semantic feature information of the fine-grained visual nodes;

acquiring respective second semantic feature information of the coarse-grained text nodes and respective second semantic feature information of the coarse-grained visual nodes based on the fully-connected coarse-grained edges, the respective first semantic feature information of the coarse-grained text nodes and the respective first semantic feature information of the coarse-grained visual nodes;

acquiring respective target semantic feature information of the fine-grained text nodes and respective target semantic feature information of the fine-grained visual nodes, based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes; and taking the respective target semantic feature information of the fine-grained text nodes and the respective target semantic feature information of the fine-grained visual nodes as the multi-granularity semantic feature information corresponding to the document image.

19. The non-transitory computer-readable storage medium of claim 18, wherein acquiring the respective first semantic feature information of the coarse-grained text nodes and the respective first semantic feature information of the coarse-grained visual nodes based on the first cross-granularity edges, the second cross-granularity edges, the respective semantic feature information of the fine-grained text nodes and the respective semantic feature information of the fine-grained visual nodes comprises:

for each coarse-grained text node, acquiring the first semantic feature information of the coarse-grained text node by determining, based on the first cross-granularity edges, target fine-grained text nodes respectively connected to the coarse-grained text node and aggregating respective semantic feature information of the target fine-grained text nodes; and for each coarse-grained visual node, acquiring the first semantic feature information of the coarse-grained visual node by determining, based on the second cross-granularity edges, target fine-grained visual nodes respectively connected to the coarse-grained visual node and aggregating respective semantic feature information of the target fine-grained visual node.

20. The non-transitory computer-readable storage medium of claim 18, wherein acquiring the respective target semantic feature information of the fine-grained text nodes and the respective target semantic feature information of the fine-grained visual nodes based on the first cross-granularity edges, the second cross-granularity edges, the respective second semantic feature information of the coarse-grained text nodes, the respective second semantic feature information of the coarse-grained visual nodes, the respective semantic feature information of the fine-grained text nodes and the respective semantic feature information of the fine-grained visual nodes comprises:

for each fine-grained text node, acquiring the target semantic feature information the fine-grained text node, by determining, based on the first cross-granularity edges, a target coarse-grained text node to which the fine-grained text node belongs, and performing fusion processing on the semantic feature information of the fine-grained text node and the second semantic feature information of the target coarse-grained text node; and for each fine-grained visual node, acquiring the target semantic feature information of the fine-grained visual node, by determining, based on the second cross-granularity edges, a target coarse-grained visual node to which the fine-grained visual node belongs, and performing fusion processing on the semantic feature information of the fine-grained visual node and the second semantic feature information of the target coarse-grained visual node.

* * * * *